July 25, 1961 H. W. BORK 2,993,518
PORTABLE POWER DRIVEN SAW
Original Filed March 31, 1958 2 Sheets-Sheet 1

INVENTOR.
Hugo. W. Bork.

July 25, 1961  H. W. BORK  2,993,518
PORTABLE POWER DRIVEN SAW
Original Filed March 31, 1958  2 Sheets-Sheet 2
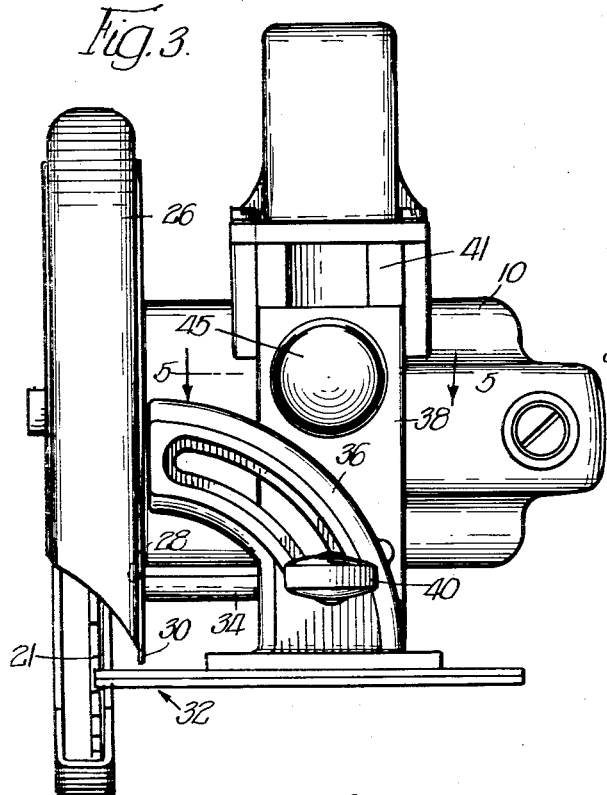
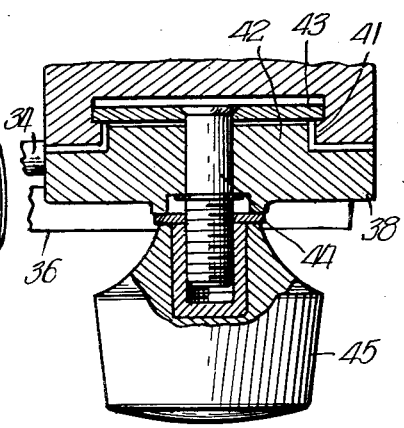
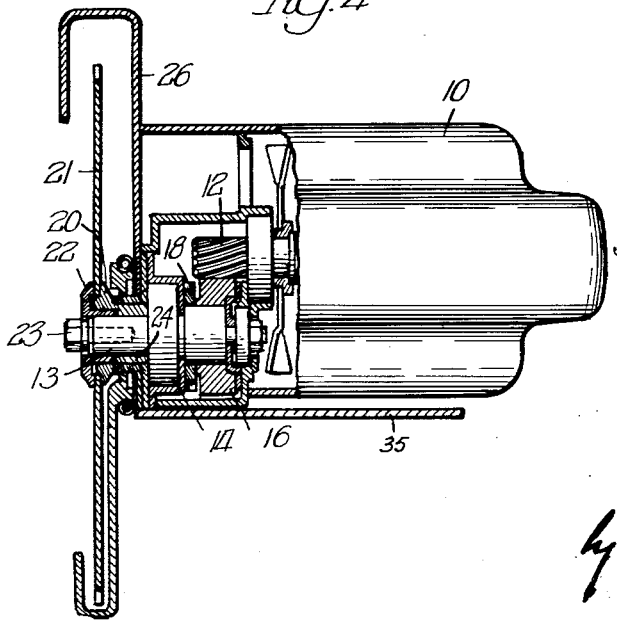
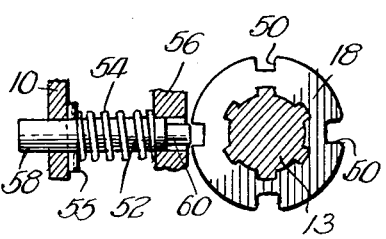
INVENTOR.
Hugo W. Bork

United States Patent Office 2,993,518
Patented July 25, 1961

2,993,518
PORTABLE POWER DRIVEN SAW
Hugo W. Bork, Chicago, Ill., assignor to Skil Corporation, Chicago, Ill., a corporation of Delaware
Original application Mar. 31, 1958, Ser. No. 725,190, now Patent No. 2,955,629, dated Oct. 11, 1960. Divided and this application May 9, 1960, Ser. No. 27,820
3 Claims. (Cl. 143—43)

This invention has to do with power-driven circular saws of the type adapted to be supported and guided in the hand of the operator while in use, and is a division of my application filed March 31, 1958, Serial No. 725,190 for Portable Power Driven Saw, issued October 11, 1960 as Patent No. 2,955,629.

Saws of this general type are inherently dangerous especially in the hands of a novice such as the home workshop user. In spite of safely precautions taken by most manufacturers in guarding the blades and other parts, many persons are injured annually primarily through their own carelessness either in operation or in maintenance of the saws so that the safety features become inoperative.

One purpose of the present invention is to provide, in saws of this type, a new and improved safety means both in the saw blade guard and in the blade-changing mechanism.

Another object is to provide safety means for the purpose intended that is simple in construction, relatively inexpensive, and requiring little or no care by the operator.

While the foregoing statements are indicative in a general way of the nature of the invention, other objects and advantages will be apparent to those skilled in the art upon a full understanding of the construction, arrangement, and operation of the parts comprising the new safety means. A preferred embodiment of invention is presented for exemplification, but it will of course be appreciated that the invention is susceptible of incorporation in other structurally modified forms coming equally within the scope of the appended claims.

In the accompanying drawings:

FIG. 3 is a front view of the saw;

FIG. 4 is a view similar to FIG. 3 with the foot assembly removed and partly in vertical section;

FIG. 5 is a view on line 5—5 of FIG. 3; and

FIG. 6 is an enlarged view of the arbor lock safety means shown in the partially sectioned view of FIG. 2.

For purposes of illustration, a saw having a vertical adjustment mechanism for depth of cut of saw blade such as shown and described in Arthur N. Emmons Patent No. 1,848,330 issued March 8, 1932 is used. But the invention is not limited to this type of adjustment as certain features of the invention are applicable to any saw of this type known to applicant while other features are applicable to any saw of the general type where the foot support is vertically adjustable relative to the forward portion of the upper saw guard and the motor housing.

Figure 2:
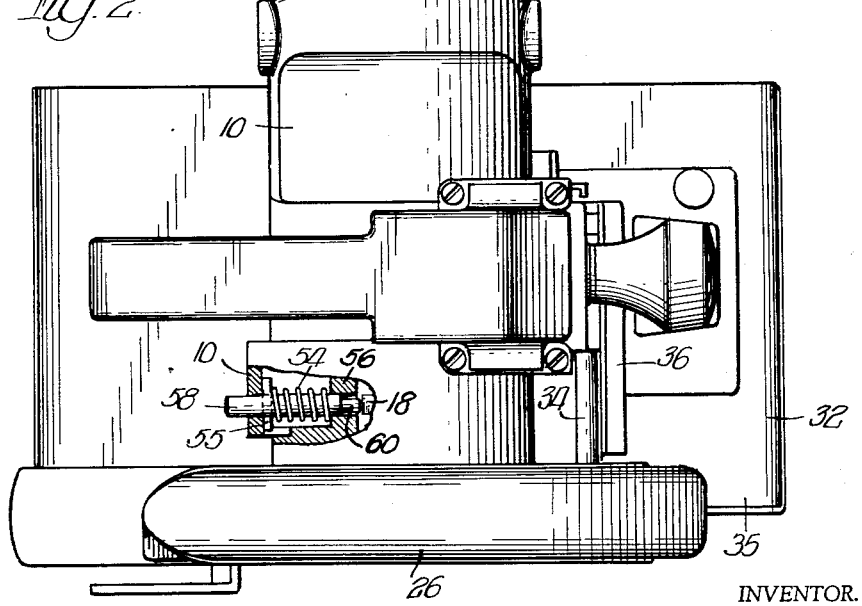
FIG. 2 is a partially sectioned top view of the saw of FIG. 1.

In the drawings, FIGS. 2, 3 and 4, is shown a motor housing 10 within which is mounted a motor (not shown) having an armature shaft 12 formed with a pinion on its outer end. A suitable driven saw arbor 13 is mounted in said housing in a bearing 14 and operatively connected to said armature shaft pinion 12 through a gear 16. The arbor shaft 13 may be splined to receive the splined gear 16 and a splined annular arbor locking plate 18 to be described later.

An inner saw blade washer 20 is mounted over the arbor and bears against the inner surface of a saw blade 21 that is mounted or clamped between washer 20 and outer washer 22 that is splined to interlock and rotate with the arbor. A threaded member such as a saw stud or bolt 23 holds this assembly together when threaded into the end of the arbor that is apertured to receive it.

Figure 1:
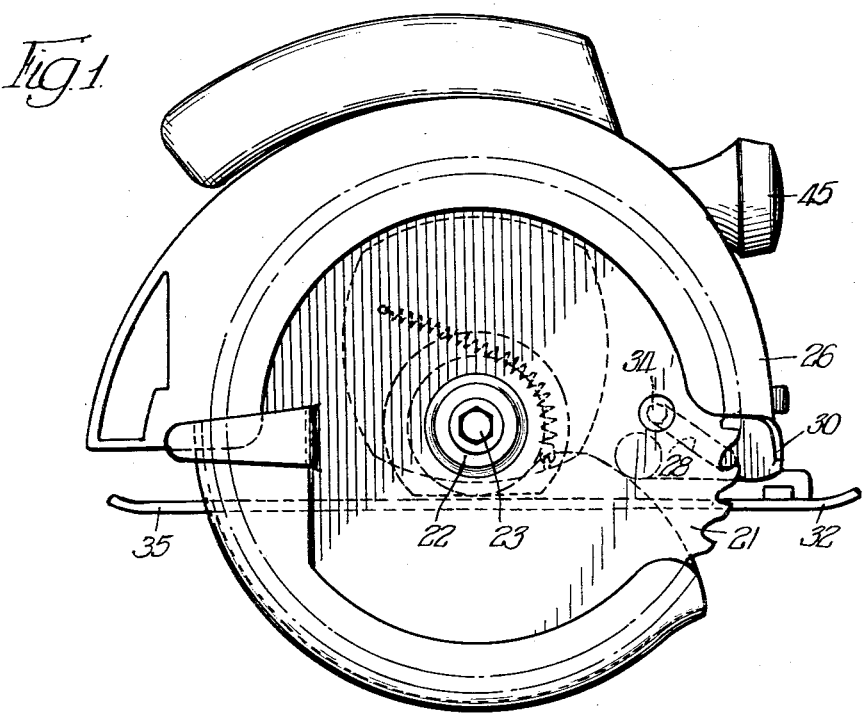
FIG. 1 is a side view of a saw which incorporates the safety means of the invention.

A bearing retainer 24 is mounted to the saw housing in spaced relation to the inner washer 20 and rotatably mounted in any suitable manner over retainer 24 is an upper saw guard member 26 that is limited in its rotating movement by a cam means such as the slot 28 (FIGS. 1, 3) so that the forward lip portion 30 of upper guard member 26 may be maintained in a guarded position adjacent the foot member assembly 32 by a cooperating cam pin 34 of the foot member.

The foot member assembly includes a substantially flat plate member 35 underlying the housing 10 and forming a support for the housing and entire saw. In normal operation it slides over a work piece taking most if not all of the weight of the saw from the operator. Mounted integrally on the foot member, and for the purposes of this embodiment considered as part of it, is a quadrant angle guide 36 by which the saw housing and the blade may be mounted angularly to the foot member 32 for angular cuts in a work piece. Attached to guide 36 is a vertical guide member 38 having a threaded pin, not shown, extending through the slot of angle guide 36 and clampable thereto in various adjusted relationships by the clamping bolt 40.

In vertical guide 38 and housing 10 are complementary vertical guide ways 41, 42 (FIG. 5) whereby housing 10 and its saw blade may be lifted or lowered with respect to foot member 32 and its vertical guide 38 so that the depth of cut of the saw blade 21 below foot member 32 may be regulated. A clamping guide plate 43 having a threaded bolt 44 extending through vertical guide 38 and tightened by clamp handle 45 may be used to hold the housing in its predetermined adjusted position. Reference is made to the Arthur N. Emmons patent mentioned above for a more specific description of this type of angular and vertical adjusting mechanism.

As cam pin 34 is mounted on vertical guide 38 it is always held to quadrant arm 36 as part of the foot member assembly and remains stationary upon vertical depth adjustment. Consequently as the housing 10, the arbor, blade and guard member are lifted, cam pin 34 rides in cam slot 28 of the upper guard member 26 forcing the guard to rotate with respect to the housing to hold the forward portion 30 of the guard adjacent foot member 32 in a continuous guarded relationship for the saw blade.

In previous devices, upon vertical adjustment of the type shown, the upper guard and its forward lip portion rose with the housing, often leaving a space of one or two or more inches unguarded between the foot member and guard member, exposing the blade to this extent and increasing the danger to the operator. With applicant's simple rotatable upper guard and cam means cooperating with the guard and foot members, this danger is eliminated.

With reference to the mounting of saw blade 21 on saw arbor 13, some years ago the blade normally was fitted to the inner or outer washer member which in turn was keyed to the arbor shaft or the saw was mounted directly to the shaft. Some saws are still made this way today. In changing saw blades, the saw blade was clamped tight by placing a nail or screw driver through the blade teeth and wedging it against the foot assembly. If this rough clamping method slipped or failed, the operator received some badly skinned knuckles from the blade teeth or guards.

When a blade is directly or indirectly keyed to the arbor there is always danger of kick-back and injury to the user if a knot is struck or the saw is overloaded in green wood. For these reasons, clutch devices of various kinds have become common so that the blade can be stopped while the arbor continues to turn, thus eliminating kick-back to a great extent. These clutch devices make blade changing most difficult, however, as the blade can be clamped by nail as set forth above but a wrench on a tight saw stud will merely turn the arbor with respect to the blade and will not loosen the stud from the arbor.

To overcome these difficulties and for safety to the operator, applicant has provided the arbor locking plate 18 splined or otherwise positively attached to arbor 13 for rotation therewith.

Locking plate 18 (FIG. 6) is formed with a plurality of locking sockets or notches 50 on its perimeter to selectively receive a lock pin 52 that is normally yieldingly held out of engagement with the notches by a compression spring 54. Lock pin 52 is slidably mounted in the wall of housing 10 and a suitable bearing member 56 spaced therefrom in the housing. It extends outwardly beyond the wall of housing 10 to form a thumb portion 58 and at its other end 60 is adapted to be pressed into a locking notch 50.

At its outer end, but within the housing 10, lock pin 52 may have a roller stop pin 55 mounted therein that forms a seat for spring 54 at one end while the spring may be seated against bearing member 56 at its other end.

From this description it will be understood that when an operator wishes to remove a saw blade 21, he will press in on lock pin 52 and apply a suitable wrench to saw stud 23. If no locking notch is immediately in place to receive pin 52, a slight turn of the stud and arbor will bring one into locking relationship. Regardless of the presence of a blade clutch or not, the arbor is locked against rotation and the stud may be removed without trouble.

I claim:

1. In a portable power driven saw the combination with a housing, a rotatable power driven arbor mounted therein and a saw blade mountable on said arbor at least in part by a threaded member, of a locking plate within said housing mounted on said arbor for rotation therewith and having a plurality of locking notches in its periphery, a radially extending lock pin slidably mounted on said housing and spring biased to present a portion to normally extend outwardly of said housing, said pin being yieldably pressable into locking engagement with one of said locking notches whereby to lock said arbor against rotation while turning said threaded member.

2. In a portable power driven saw the combination with a housing, a rotatable power driven arbor mounted therein and a saw blade mountable on said arbor at least in part by a threaded member, of means for locking said arbor against rotation while turning said threaded member, said means including a locking plate mounted on said arbor for positive rotation therewith and having locking notches therein, complementary locking means on said housing presenting a portion to engage said locking plate, said locking means being accessible from the exterior of said housing, said locking means and said plate being thereby adapted to be interengaged to prevent rotation of said plate and arbor.

3. In a portable power driven saw the combination with a housing, a rotatable power driven arbor mounted therein and a saw blade mountable on said arbor at least in part by a threaded member, of means for locking said arbor against rotation while turning said threaded member, said means including a locking plate positively mounted on said arbor for rotation therewith, a plurality of spaced locking sockets in said plate, a locking pin slidably mounted on said housing adjacent said plate and adapted to be slid into and out of locking engagement with one of said locking sockets, a portion of said pin extending exteriorly of said housing when out of locking engagement and yielding means biasing said pin out of said locking engagement.

References Cited in the file of this patent

UNITED STATES PATENTS

| 741,034 | Hazelton | Oct. 13, 1903 |
| 1,400,614 | Lovejoy | Dec. 20, 1931 |
| 1,848,330 | Emmons | Mar. 8, 1932 |
| 1,900,553 | Hampton | Mar. 7, 1933 |